United States Patent
Shohara et al.

(10) Patent No.: US 6,238,754 B1
(45) Date of Patent: May 29, 2001

(54) LIQUID CRYSTAL DISPLAY DEVICE

(75) Inventors: Kiyoshi Shohara, Urawa; Daisuke Miyazaki, Kamakura; Natsuko Maya, Fukaya; Muneharu Akiyoshi, Urawa; Atsuyuki Manabe; Masumi Manabe, both of Fukaya; Nobuko Fukuoka, Honjyo; Kisako Ninomiya, Fukaya; Hitoshi Hatoh, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/345,756

(22) Filed: Jul. 1, 1999

(30) Foreign Application Priority Data

Nov. 16, 1998 (JP) .................................................. 10-325673

(51) Int. Cl.$^7$ .......................... C09K 19/54; G02F 1/1335; G02F 1/1339
(52) U.S. Cl. ........................ 428/1.5; 252/299.5; 349/153; 349/155; 349/190
(58) Field of Search .................................. 428/1.5, 1.51; 252/299.5; 349/190, 153, 155

(56) References Cited

U.S. PATENT DOCUMENTS 5,625,475 * 4/1997 Tanioka et al. ...................... 349/123

FOREIGN PATENT DOCUMENTS 5-127166 * 5/1993 (JP) .
5-210095 * 8/1993 (JP) .
9-33912 2/1997 (JP) .

OTHER PUBLICATIONS

English abstract of JP 5–127166, 1993.*
English abstract of JP 9–33912, 1997.*
English abstract of JP 5–210095, 1997.*

* cited by examiner

Primary Examiner—Shean C. Wu
(74) Attorney, Agent, or Firm—Pillsbury Winthrop LLP

(57) ABSTRACT

Disclosed is a liquid crystal display device, comprising two substrates each having an alignment film, a sealing member arranged in the outer peripheries of the two substrates to permit the outer peripheries of these two substrates, which are arranged such that the alignment films of these two substrates face each other, to be bonded to each other except a liquid crystal filling port, a spacer for keeping the two substrates a predetermined distance apart from each other, a liquid crystal layer formed by filling a liquid crystal material through the liquid crystal filling port into the clearance between the two substrates, and an end-sealing material for sealing the liquid crystal filling port, wherein total amounts of an alkyl acid, phenyl carboxylic acid or a phenyl carboxylic acid derivative, phenylene dicarboxylic acid or a phenylene dicarboxylic acid derivative, an alkyl amine, aniline or an aniline derivative, phenylene diamine or a phenylene diamine derivative, phenyleneamine carboxylic acid or a phenyleneamine carboxylic acid derivative, an alkyl imide, a phthalimide derivative, a cyano benzene derivative, and a dicyano benzene derivative contained in the sealing member, the end-sealing material and the spacer is not larger than 3%.

19 Claims, 2 Drawing Sheets

LIQUID CRYSTAL DISPLAY DEVICE

BACKGROUND OF THE INVENTION

The present invention relates to a liquid crystal display device, a color filter substrate used therein and a color filter member.

A liquid crystal display device comprises two electrode substrates each having an alignment film and arranged such that the alignment films of the two substrates face each other and a liquid crystal layer arranged between the two substrates. The two electrode substrates are bonded to each other with a sealing member arranged in the peripheral region of the substrate and an end-sealing material. Also, a granular spacer or a spacer column made of a resin and formed by a photolithography method is arranged between the two substrates for keeping these two substrates a predetermined distance apart from each other. For allowing the liquid crystal display device to perform a color display, colored layers of red (R), green (G) and blue (B) are arranged on one of the substrates and, as desired, a transparent protective layer made of a resin is formed on the substrate having colored layers and a switching element mounted thereto.

In a liquid crystal display device of the particular construction, nonuniformity such as an image sticking and a display unevenness taking place after the durability (reliability) test are derived from the members in direct contact with the liquid crystal layer or the alignment film such as the sealing member, the end-sealing material, the spacer material, the protective layer and the colored layer.

BRIEF SUMMARY OF THE INVENTION

An object of the present invention is to provide a liquid crystal display device that permits preventing the display unevenness, etc. derived from the members in direct contact with the liquid crystal layer or the alignment film.

Another object is to provide a member of a colored layer of a liquid crystal display device that permits preventing the display unevenness, etc. derived from the members in direct contact with the liquid crystal layer or the alignment film.

In the present invention, total amounts of an alkyl acid, phenyl carboxylic acid, a phenyl carboxylic acid derivative, phenylene dicarboxylic acid, a phenylene dicarboxylic acid derivative, an alkyl amine, aniline, an aniline derivative, phenylene diamine, a phenylene diamine derivative, phenyleneamine carboxylic acid, a phenyleneamine carboxylic acid derivative and an alkyl imide contained in or extracted from the sealing member, the end-sealing material, the spacer, the colored layer, etc. is controlled to fall within a predetermined range so as to prevent alignment unevenness and image sticking.

The alignment unevenness or image sticking is considered to take place by eluation into the liquid crystal or adsorption on the alignment film of organic impurities contained in the sealing member, the end-sealing material, the spacer material, the colored layer, etc. such as an alkyl acid, phenyl carboxylic acid, a phenyl carboxylic acid derivative, phenylene dicarboxylic acid, a phenylene dicarboxylic acid derivative, an alkyl amine, aniline, an aniline derivative, phenylene diamine, a phenylene diamine derivative, phenyleneamine carboxylic acid, a phenyleneamine carboxylic derivatives an alkyl imide, a phthalimide derivative, a cyano benzene derivative, and a dicyano benzene derivative, when the liquid crystal layer is held between the electrode substrates to assemble a liquid crystal display device. In other words, the alignment unevenness or image sticking is considered to take place in the case where the sealing member, the end-sealing material, the spacer material, the colored layer, etc. include a region that is brought into direct contact with the liquid crystal layer or the alignment film. It is considered reasonable to understand that the impurities contained in the sealing member, the end-sealing material, the spacer material, the colored layer, etc. permeate into the liquid crystal layer or the alignment film that are included in the display region so as to bring about eluation of these impurities into the liquid crystal layer and adsorption of these impurities on the alignment film so as to generate the alignment unevenness and image sticking. These impurities have been found to be contained in large amounts in, particularly, the green layer and the black layer included in the colored layers. Pigments G7 and G36 are generally used as parts of the green coloring material and the black coloring material of the color filter included in the liquid crystal display device. The impurities given above are contained in large amounts in these pigments. Further, impurities are contained in large amounts in the dispersant and polymer components used for dispersing these pigments into a colored paste. It is also conceivable that impurities are mixed unexpectedly in the resist preparation step in which the colored paste is mixed and dispersed. Further, the pigments and the dispersant are considered to be decomposed under high temperatures, by contact with an alkali or by exposure to an ultraviolet light, so as to generate the organic impurities noted above. Therefore, the green layer has been found to cause large amounts of impurities to be generated in the liquid crystal layer and the alignment film, compared with the red or blue layer. It is possible to suppress generation of the organic impurities by suitably refining the pigment and dispersant for preparation of a resist used for forming the green layer and by suitably selecting the materials used for the refining.

The present inventors have conducted a simple evaluation test in respect of the influences (particularly, image sticking) given to the display when various organic and inorganic substances are contained in a liquid crystal cell and when the materials used are refined. The experiment was conducted as follows.

Specifically, a TN liquid crystal cell was prepared by coating an alignment film on each of an array substrate having a switching element and a pixel electrode formed on a glass substrate and a counter substrate having a counter electrode formed on a glass substrate, followed by arranging these two substrates to permit the alignment films to face each other with a liquid crystal layer interposed therebetween. Two kinds of alignment film materials and two kinds of liquid crystal materials were used in the experiment, and the image sticking and display unevenness taking place after a durability (reliability) test were evaluated under the conditions that various organic and inorganic substances were attached to the alignment films. Table 1 shows the results.

TABLE 1

|  | Attached substance | Alignment film | Liquid crystal A nonuniform image sticking/nonuniform reliability (display unevenness) | Liquid crystal B nonuniform image sticking/nonuniform reliability (display unevenness) |
|---|---|---|---|---|
| 1 | phthalic acid | P1 | x/x | x/x |
| 2 | phthalic acid | P2 | x/x | x/x |
| 3 | terephthalic acid | P1 | x/x | x/x |
| 4 | terephthalic acid | P2 | x/x | Δ/x |
| 5 | para-phthalic acid | P1 | x/x | x/x |
| 6 | para-phthalic acid | P2 | Δ/x | Δ/Δ |
| 7 | dichlorophthalic acid | P1 | x/x | x/x |
| 8 | dichlorophthalic acid | P2 | x/x | Δ/x |
| 9 | benzoic acid | P1 | x/x | Δ/x |
| 10 | benzoic acid | P2 | x/x | Δ/Δ |
| 11 | decanoic acid | P1 | x/x | x/x |
| 12 | decanoic acid | P2 | x/x | Δ/x |
| 13 | tetradecanoic acid | P1 | x/x | x/x |
| 14 | tetradecanoic acid | P2 | x/x | Δ/x |
| 15 | acetic acid | P1 | x/x | Δ/x |
| 16 | acetic acid | P2 | Δ/x | Δ/Δ |
| 17 | oxalic acid | P1 | x/x | x/x |
| 18 | oxalic acid | P2 | Δ/Δ | Δ/Δ |
| 19 | hexadecamine | P1 | x/x | Δ/Δ |
| 20 | hexadecamine | P2 | x/x | Δ/Δ |
| 21 | aniline | P1 | x/x | Δ/Δ |
| 22 | aniline | P2 | Δ/x | Δ/Δ |
| 23 | N-methyl aniline | P1 | x/x | Δ/x |
| 24 | N-methyl aniline | P2 | x/x | Δ/Δ |
| 25 | phthalic acid amide | P1 | x/x | x/x |
| 26 | phthalic acid amide | P2 | Δ/Δ | Δ/Δ |
| 27 | N-methylamino aniline | P1 | x/x | x/x |
| 28 | N-methylamino aniline | P2 | x/x | Δ/Δ |
| 29 | para-chlorobenzoic acid | P1 | x/x | Δ/Δ |
| 30 | para-chlorobenzoic acid | P2 | Δ/x | Δ/Δ |
| 31 | table salt | P1 | ○/○ | ○/○ |
| 32 | hydrochloric acid | P2 | ○/○ | ○/○ |
| 33 | calcium carbonate | P1 | ○/○ | ○/○ |
| 34 | phthalic anhydride | P2 | ○/○ | ○/○ |
| 35 | hexadecane | P1 | ○/○ | ○/○ |
| 36 | toluene | P1 | ○/○ | ○/○ |
| 37 | ethanol | P1 | ○/○ | ○/○ |

Notes:
Alignment film:
P1 . . . SE-5291 (trade name); P2 . . . Al-1051 (trade name)
Liquid Crystal:
A . . . ZLI-1565 (trade name); B . . . LIXON-5 (trade name)
x . . . occurrence of nonuniform image sticking/nonuniform reliability (display unevenness)
Δ . . . occurrence of slightly nonuniform image sticking/slightly nonuniform reliability (display unevenness)
○ . . . no occurrence of nonuniform image sticking/nonuniform reliability (display unevenness)

A soluble polyimide SE-5291 manufactured by Nissan Chemical K. K. and a soluble polyimide A1-1051 manufactured by JSR K. K. were used for forming alignment films P1 and P2, respectively, shown in Table 1. Also, cyano series liquid crystal material ZLI-1565 manufactured by E. Merc Inc. and LIXON5001 manufactured by Chisso K. K. were used as liquid crystals A and B, respectively, shown in Table 1. For preparing the liquid crystal cell, an array substrate and a counter substrate were prepared first. Then, each of these substrates was coated with an alignment film material, followed by applying a heat treatment to the coating at 180° C. for 60 minutes and subsequently applying a rubbing treatment to the coating to prepare an alignment film. The alignment film thus prepared was partially coated with 1 μliter of an IPA (isopropyl alcohol) solution prepared by dissolving 10% by weight of the organic or inorganic substance shown in Table 1 as an attached material in IPA, followed by arranging the array substrate and the counter substrate to face each other with a liquid crystal layer interposed therebetween so as to assemble the liquid crystal cell. For evaluating the nonuniform image sticking, a checker pattern of the liquid crystal cell was kept imaged for 3 hours for evaluating the degree of nonuniform image sticking of the checker pattern in the vicinity of the coated region by the whole tone display pattern. Further, the liquid crystal cell was kept imaged for 100 hours at 50° C. and a relative humidity of 80% for evaluating the display unevenness, by a reliability test. Through these evaluation tests, the present inventors have found that the presence of specified organic substances within the liquid crystal cell brings about an image sticking and a display unevenness in the reliability test, as shown in Table 1. The specified organic substances noted above include an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11):

$R_1$—(COOH)$_n$ (1)

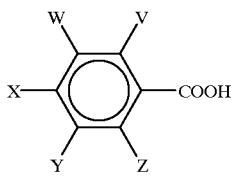
(2)

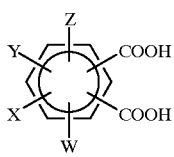
(3)

$R_1$—NH$_2$ (4)

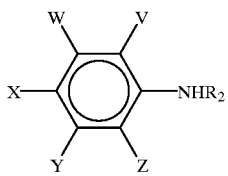
(5)

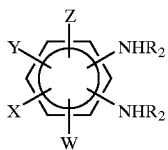
(6)

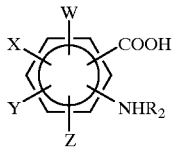
(7)

$R_1$—NR$_2$R$_3$ (8)

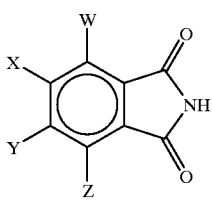
(9)

-continued

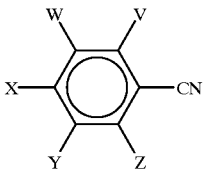
(10)

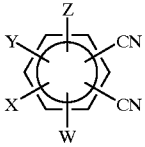
(11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —C$_6$H$_5$ and —H, and n is 1 or 2.

In the present invention, the impurity content represents the percentage by weight (% by weight) based on the total amount of the sealing member, the end-sealing material, the spacer material and the colored layer of the liquid crystal cell, i.e., the impurity content under the condition that these cell members of the liquid crystal cell were cured. On the other hand, the extraction amount represents a value when the cell members were assembled to form a liquid crystal cell, i.e., a value when the sealing member, the end-sealing material, the spacer material and the colored layer after curing were extracted into the liquid crystal. For extraction, the cured pieces of the cell members and the liquid crystal were put in an ampule tube and, after the ampule tube was sealed, stored for 100 hours at 80° C. for the analysis. The amounts of the cured pieces of the cell members were found to be 10 mm$^3$ for the colored layer, 2 mm$^3$ for the sealing member, 0.1 mm$^3$ for the spacer material, and 0.05 mm$^3$ for the end-sealing material. The amount of the liquid crystal was 50 cc. A fluorine-contained liquid crystal and a cyano-contained nematic liquid crystal can be used as a liquid crystal material for the extraction. Specifically, used were a cyano-contained liquid crystal of ZLI-1565 manufactured by E. Merc Inc. and a fluorine-contained liquid crystal of LOXON50001 manufactured by Chisso K. K. It is possible to use "Shimazu 14A" (trade name of a gas chromatography analytical apparatus manufactured by Shimazu Seisakusho K. K.) or "Shimazu 10AS" (trade name of a liquid chromatography analytical apparatus manufactured by Shimazu Seisakusho K. K.) as a measuring apparatus. A gas chromatography analytical apparatus was used this time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A liquid crystal display device according to a first embodiment of the present invention will now be described with reference to FIGS. 1 and 2.

Figure 1:
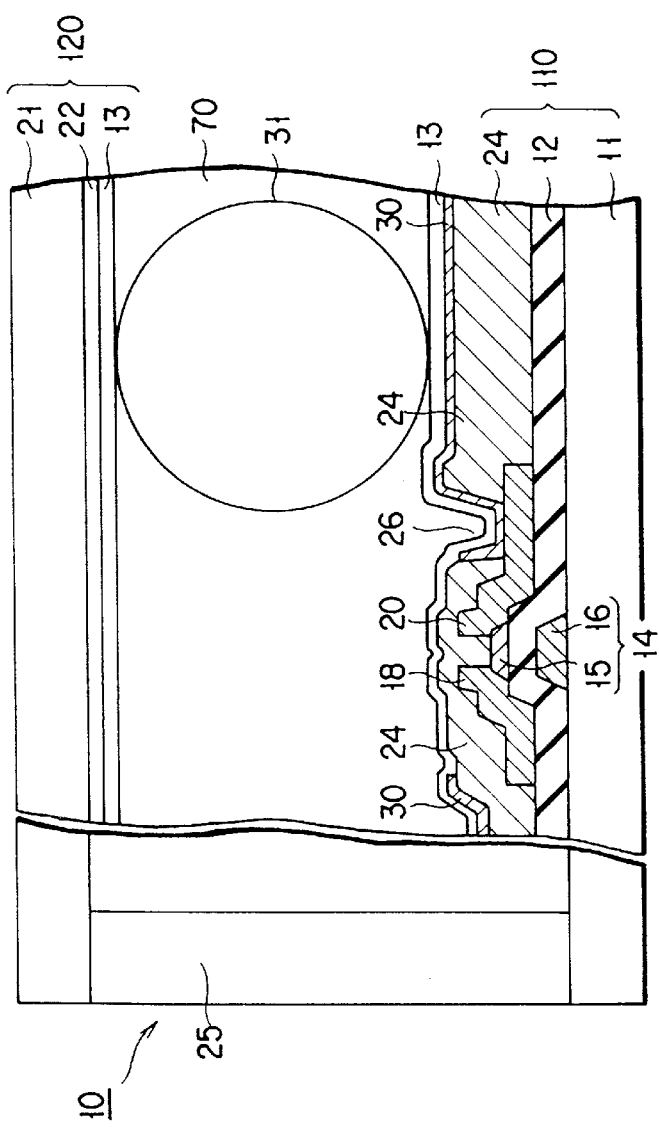
FIG. 1 is a vertical cross sectional view showing a liquid crystal display device according to one embodiment of the present invention.
Figure 2:
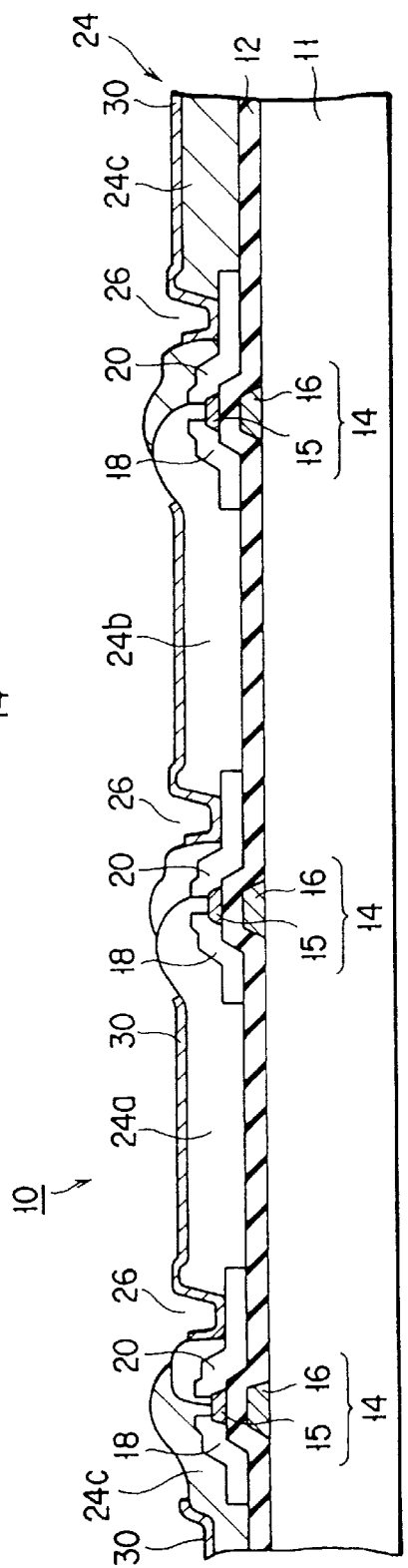
FIG. 2 is a vertical cross sectional view showing an array substrate included in the liquid crystal display device according to the embodiment of the present invention.

FIG. 1 schematically shows a liquid crystal display device of the present invention and schematically illustrates the color filter substrate included in the liquid crystal display device shown in FIG. 2.

Figure 4:
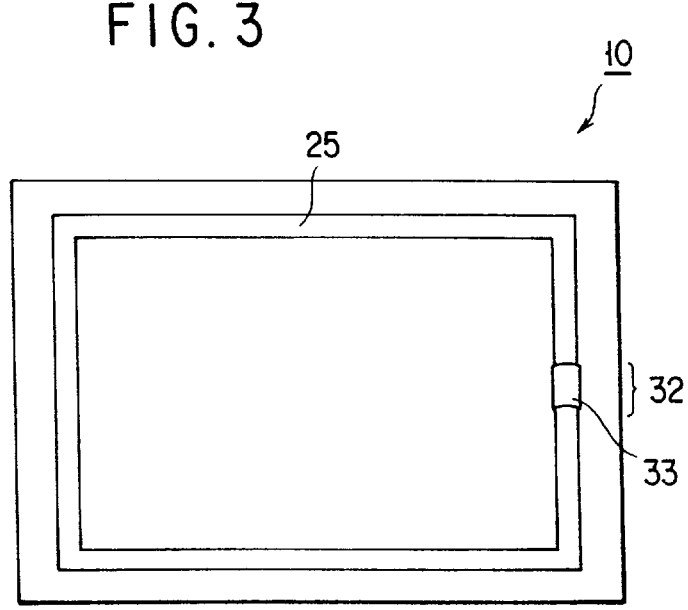
FIG. 4 is a plan view schematically showing the coating positions of the sealing member and the end-sealing material included in the liquid crystal display device of the present invention.

As shown in FIG. 1, a liquid crystal display device 10 includes a counter substrate 120, a color filter substrate 110, and a liquid crystal layer 70 held between the substrates 120 and 110. These two substrates are held apart from each other by, for example, a granular spacer 31. As shown in FIG. 4, the counter substrate 120 and the color filter substrate 110 are bonded to each other by a sealing member 25 arranged to surround the outer peripheries of these substrates except a liquid crystal filling port 32. Also, the liquid crystal filling port 32 is sealed with an end-sealing material 33. ZLI-1565 manufactured by E. Merc Inc. was used as the liquid crystal material. Also, a thermosetting epoxy series adhesive ES-5500 manufactured by Mitsui Toatsu Kagaku K. K. was used as the sealing material.

The counter substrate 120 includes a transparent substrate 21, a transparent electrode 22 made of ITO and formed on the substrate 21, and an alignment film 13 formed on the electrode 22.

As shown in FIG. 2, the array substrate includes a transparent substrate 11. A scanning line (not shown) made of MoW (molybdenum·tungsten) and a gate electrode 16 are formed on the transparent substrate 11. A gate insulating film 12 made of silicon oxide or silicon nitride is arranged to cover the scanning line and the gate electrode 16. A semiconductor layer 15 made of amorphous silicon or the like is formed on the gate insulating film 12. Further, a source electrode 20, a drain electrode 18 and a signal line (not shown) each having a three-layer structure of Mo/Al/Mo are also formed on the gate insulating film 12. The signal line and the scanning line are arranged to cross each other. A switching element 14 consisting of the gate electrode 16, the gate insulating film 12, the semiconductor layer 15, the source electrode 20 and the drain electrode 18 and a pixel electrode 30 connected to the switching element 14 are arranged at each cross point between the signal line and the scanning line. Further, a red (R) colored layer 24a, a green (G) colored layer 24b and a blue (B) colored layer 24c are arranged to cover the switching element 14 and to form a stripe on the entire substrate surface. The pixel electrode 30, which is positioned on the colored layer 24, is connected to the source electrode 20 via a contact hole 26 formed in the colored layer 24. Further, an alignment film 13 is formed on the entire substrate surface to cover the pixel electrode 30 and the colored layer 24. The colored layer portions were formed of CG-2000, CR-2000 and CB-2000 (trade names of ultraviolet light curing type acrylic resins manufactured by Fuji Hunt Technology K. K.) and the alignment film was formed of AL-1051 (trade name of polyimide manufactured by JSR K. K.).

The manufacturing process of the liquid crystal display device of this embodiment and the relationship between the amount of the impurities contained in the colored layer and the display characteristics will now be described.

The manufacturing process of the color filter substrate 110 will be described first. In the first step, the gate electrode 16 and the scanning line were formed by depositing a molybdenum·tungsten film in a thickness of about 0.3 $\mu$m by a sputtering method on the transparent substrate 11, followed by pattering the deposited film. Then, an amorphous silicon film was deposited by a CVD method, followed by patterning the deposited film to form the semiconductor layer 15 of TFT. Further, Mo, Al and Mo were deposited successively, followed by patterning the deposited films to form the signal line, the source electrode 20 and the drain electrode 18.

In the next step, the substrate surface having the electrodes formed thereon was coated with an ultraviolet light curing type acrylic red resist solution CR-2000 by a spin coating method. The coating was pre-baked for about 5 minutes at about 90° C., followed by exposing the pre-baked coating to an ultraviolet light having an intensity of 150 mJ/cm² through a predetermined mask pattern. The photo mask pattern used in this step included a stripe pattern corresponding to the red colored layer and a circular pattern having a diameter of 15 $\mu$m corresponding to the contact hole 26 for connecting the pixel electrode 30 to the source electrode 20. Then, development was performed for about 60 minutes by using an aqueous solution containing about 0.1% by weight of TMAH (tetramethylammonium hydride), followed by water wash and, then, post-baking for about one hour at about 200° C. so as to form the red colored layer 24a including the contact hole 26.

Then, the green colored layer 24b and the blue colored layer 24c were formed similarly.

Further, indium tin oxide (ITO) was deposited on the colored layer 24 by a sputtering method, followed by patterning the resultant ITO layer to form the pixel electrode 30. Then, the entire surface of the substrate was coated with polyimide used as a material of the alignment film, followed by applying an alignment treatment to the polyimide coating to form the alignment film so as to obtain the color filter substrate 110.

In the next step, ITO was deposited in a thickness of about 100 nm by a sputtering method on the transparent substrate 21 to prepare the counter electrode 22. Then, the entire surface of the substrate was coated with polyimide used as a material of the alignment film, followed by applying an alignment treatment to the polyimide coating to form the alignment film so as to prepare the counter substrate 120.

Granular spacer particles 31 each having a diameter of about 5 $\mu$m were dispersed on the alignment film of the counter substrate 120 at a rate of about 100 particles per square millimeter. Then, the outer peripheral portion of the counter substrate 120 was coated with the sealing member 25 having fibers of a predetermined size mixed therein except the liquid crystal filling port. The counter substrate 120 of the particular condition was bonded to the color filter substrate 110 using the sealing member 25 so as to form a vacant cell.

Finally, a nematic liquid crystal material having a chiral material added thereto was introduced under vacuum into the cell through the liquid crystal filling port. After the filling, the filling port was sealed with an ultraviolet light curing resin used as the end-sealing material 33, followed by arranging polarizing plates on both sides of the cell so as to form the liquid crystal display device.

The present inventors have found through the trial manufacture that the impurities contained in the sealing material, the end-sealing material, the spacer material and the colored layer are eluded into the liquid crystal or adsorbed on the alignment film so as to bring about the display unevenness and nonuniform image sticking and that the display unevenness and the nonuniform image sticking can be prevented by regulating the impurity content. The specific impurities were already described herein under the heading "Brief Summary of the Invention".

Tables 2 to 5 show experimental data covering the cases where various impurities were added to the liquid crystal cell included in the liquid crystal display device described above. The total impurity content shown in the Tables denotes the percentage by weight of the impurities based on the sum in weight of the sealing member, the end-sealing material, the spacer material and the colored layer. Also, the total extraction amount of the impurities denotes the extraction amount in the case where the cell members were assembled into a liquid crystal cell.

Table 2 shows the experimental data on the display characteristics covering the case where aniline used as an impurity was added to the sealing member in various amounts.

TABLE 2

| Added impurity | Addition amount | Total impurity content | Total extraction amount of impurities when extracted with liquid crystal | Display characteristics | |
|---|---|---|---|---|---|
| | | | | Poor display (image sticking) | Poor display (poor reliability) |
| aniline | 0% | 1% | 20 ppm | none | none |
| aniline | 2% | 4% | 70 ppm | none | none |
| aniline | 5% | 6% | 110 ppm | slight image sticking occurred | display unevenness occurred |
| aniline | 10% | 11% | 200 ppm | severe image sticking occurred | display unevenness severely occurred |

Table 3 shows the experimental data on the display characteristics covering the vase where phthalic acid used as an impurity was added to the sealing member in various amounts.

TABLE 3

| Added impurity | Addition amount | Total impurity content | Total extraction amount of impurities when extracted with liquid crystal | Display characteristics | |
|---|---|---|---|---|---|
| | | | | Poor display (image sticking) | Poor display (poor reliability) |
| phthalic acid | 0% | 1% | 20 ppm | none | none |
| phthalic acid | 2% | 4% | 80 ppm | none | none |
| phthalic acid | 5% | 6% | 150 ppm | slightly occurred around filling port | poor display occurred around filling port |
| phthalic acid | 10% | 11% | 320 ppm | slightly occurred around filling port | poor display severely occurred around filling port |

Table 4 shows the experimental data on the display characteristics, covering the case where the spacer of the liquid crystal cell was prepared by patterning a black resin CK-2000 in place of using the granular spacer, and benzoic acid used as an impurity was added to the spacer material in varied amounts.

TABLE 4

| Added impurity | Addition amount to resist | Impurity content under resist state | Total impurity content of colored layer under cured state | Total extraction amount of impurities when extracted with liquid crystal | Display characteristics Poor display (image sticking) | Poor display (poor reliability) |
|---|---|---|---|---|---|---|
| benzoic acid | 0% | 0.05% | 1% | 40 ppm | none | none |
| benzoic acid | 0.05% | 0.10% | 2% | 90 ppm | none | none |
| benzoic acid | 0.5% | 0.55% | 4% | 160 ppm | none | slight occurrence of poor display |
| benzoic acid | 2% | 2.05% | 11% | 250 ppm | slight occurrence | occurrence of poor display |

Table 5 shows the experimental data on the display characteristics, covering the case where decanoic acid used as an impurity was added to the resist for the red colored layer in varied amounts.

TABLE 5

| Added impurity | Addition amount to resist | Impurity content under resist state | Total impurity content of colored layer under cured state | Total extraction amount of impurities when extracted with liquid crystal | Display characteristics Poor display (image sticking) | Poor display (poor reliability) |
|---|---|---|---|---|---|---|
| decanoic acid | 0% | 0.01% | 1% | 20 ppm | none | none |
| decanoic acid | 0.05% | 0.06% | 2% | 100 ppm | none | none |
| decanoic acid | 0.5% | 0.501% | 4% | 180 ppm | slight occurrence | none |
| decanoic acid | 2% | 2.01% | 11% | 260 ppm | occurred | none |

Table 6 shows the experimental data on the display characteristics, covering the case where used was resist having the impurity content reduced by using a refined resist for the green colored layer as well as a refined pigment and a refined dispersant.

TABLE 6

| | Addition amount to resist | Total impurity content | Total extraction amount of impurities when extracted with liquid crystal | Display characteristics Poor display (image sticking) | Poor display (poor reliability) |
|---|---|---|---|---|---|
| resist for green colored layer not using refining material | 0.3% | 8% | 500 ppm | occurred | poor display occurred |
| resist for green colored layer using refining material | 0.01% | 2% | 50 ppm | none | none |

Figure 3:
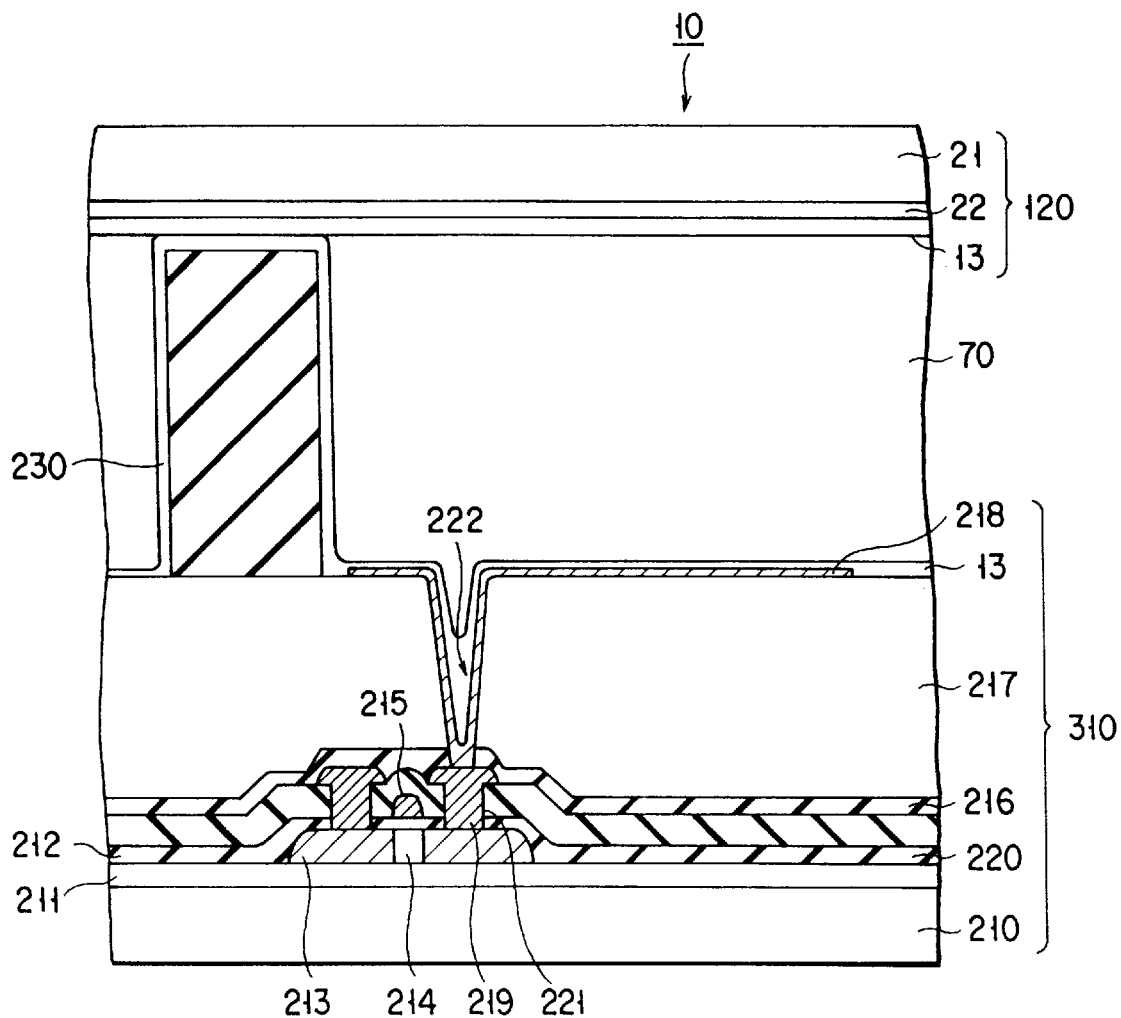
FIG. 3 is a vertical cross sectional view showing a liquid crystal display device according to another embodiment of the present invention.

FIG. 3 shows a second embodiment of the present invention. In the first embodiment, the switching element is of reverse staggered type in which an amorphous silicon is used as a semiconductor layer. In the second embodiment, however, the switching element is of a forward staggered type in which a polycrystalline silicon is used as a semiconductor layer. Also, a columnar spacer is used in the second embodiment, though a spherical spacer is used in the first embodiment. In the second embodiment, a black resin having red, green and blue pigments mixed therein is used for forming the spacer.

As shown in FIG. 3, a liquid crystal display device 10 of the second embodiment comprises a counter substrate 120, an array substrate 310, a liquid crystal layer 70 held between the counter substrate 120 and the array substrate 310, and a columnar spacer 230 for keeping these two substrates a predetermined distance apart from each other. The counter substrate 120 includes a glass substrate 21, a counter electrode 22 formed on the glass substrate 21, and an alignment film 13 formed on the counter electrode 22. On the other hand, the array substrate 310 includes a glass substrate 210, an undercoating layer 211 of a double-layer structure consisting of a silicon oxide film and a silicon nitride film and formed on the glass substrate 210, a semiconductor active layer 214 (channel region) and high impurity regions 213 forming source and drain regions, said active layer 214 and high impurity regions 213 being formed on the undercoating layer 211, a gate oxide film 212 formed to cover the active layer 214 and the high impurity regions 213, and a gate electrode 215 formed on the gate oxide film 212, thereby forming a polycrystalline silicon TFT of a forward staggered type. Incidentally, the scanning line (not shown) is formed in the step of forming the gate electrode 215. A signal line 219 of a double-layer structure consisting of a Mo layer and an Al layer is formed on the scanning line and the gate insulating film 212. The signal line 219 is connected to the high impurity regions 213 via a first contact hole 221 extending through an interlayer insulating film 220 and the gate insulating film 212. An inorganic insulating film 216 of a double-layer structure consisting of a silicon oxide film and a silicon nitride film and a colored layer 217 made of an organic resin, having a thickness of 3 μm, and in the shape of a stripe of red, blue and green colors are formed on the signal line 219. A second contact hole 222 is formed through the inorganic insulating film 216 and the colored layer 217. The columnar spacer 230 is formed on that region of the colored layer 217 in which a pixel electrode is not formed in the subsequent step to keep the array substrate 310 and the counter substrate 120 a predetermined distance apart from each other. A pixel electrode 218 consisting of ITO (Indium Tin Oxide) is formed on the colored layer 217 so as to be electrically connected to the signal line 219. Further, the alignment film 13 is formed to cover the spacer 230, the pixel electrode 218 and the colored layer 217. The columnar spacer 230 is formed of a black colored layer, i.e., a layer of CK-2000 (trade name of an ultraviolet light curing type acrylic resin consisting of an organic resin and red, green and blue pigments contained in the organic resin and manufactured by Fuji Hunt Technology K. K.). In forming the columnar spacer 230, a light shielding layer was formed simultaneously along the outer periphery of the substrate.

The amounts of impurities when the colored layer and the spacer are extracted in the liquid crystal material and the impurity content of the colored layer and the spacer after formed are defined in the second embodiment, too, making it possible to obtain a liquid crystal display device exhibiting good display characteristics.

As described above, the impurities have been found to be contained in large amounts in, particularly, the green layer among the three colored layers, supporting that it is effective to define the impurity content of, particularly, the green layer among the colored layers. It has also been found that, in the case of using a black resin, i.e., resin containing red, green and blue pigments, it is effective to decrease the impurity content of the black resin because the black resin contains a green pigment.

The particular effect of the present invention can also be obtained in the case where the technical idea of the present invention is applied to a liquid crystal display device constructed such that a color filter is arranged on the counter substrate positioned to face the array substrate and the counter electrode is formed on the color filter. In a liquid crystal display device of the particular construction, a lead-out electrode or the like is patterned in the step of forming the counter electrode, and the display device includes a region in which the liquid crystal layer is in contact with the colored layer directly or with an alignment film interposed therebetween. It is effective to decrease the impurity content of the colored layer as in the present invention in the display device of the particular construction, too. Also, when it comes to a liquid crystal display device in which an opening is formed in the counter electrode to partially control the generated electric field so as to control the direction of alignment of the liquid crystal molecules, the technical idea of the present invention produces a prominent effect because the liquid crystal layer is in contact with the colored layer directly or with the alignment film interposed therebetween.

As described above, the impurity content of an organic resin film that is in contact with the liquid crystal layer directly or with a film that is likely to permit permeation of impurities such as an alignment film interposed therebetween is decreased in the present invention so as to obtain a liquid crystal display device capable of preventing an image sticking and achieving a good display performance.

It should be noted that the amounts of the impurities contained in the colored layer, the sealing member and the spacer material are defined in the present invention so as to prevent nonuniform image sticking and the display unevenness taking place after the durability (reliability) test.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device, comprising two substrates each having an alignment film, a sealing member arranged in the outer peripheries of said two substrates to permit the outer peripheries of these two substrates, which are arranged such that the alignment films of these two substrates face each other, to be bonded to each other except a liquid crystal filling port, a spacer for keeping the two substrates a predetermined distance apart from each other, a liquid crystal layer formed by filling a liquid crystal material through said liquid crystal filling port into the clearance between the two substrates, and an end-sealing material for clogging the liquid crystal filling port, wherein total amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) contained in the sealing member, the end-sealing material and the spacer is not larger than 3%:

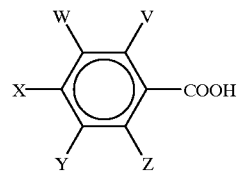

-continued

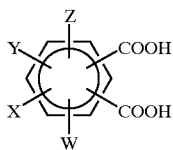 (3)

$R_1-NH_2$ (4)

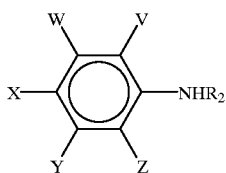 (5)

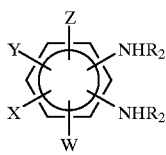 (6)

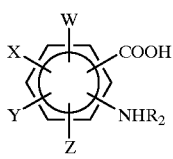 (7)

$R_1-NR_2R_3$ (8)

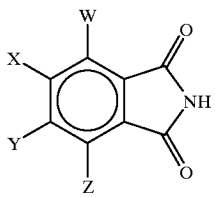 (9)

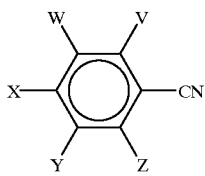 (10)

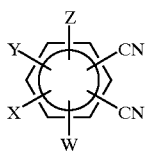 (11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

2. A liquid crystal display device, comprising two substrates each having an alignment film, a sealing member arranged in the outer peripheries of said two substrates to permit the outer peripheries of these two substrate, which are arranged such that the alignment films of these two substrates face each other, to be bonded to each other except a liquid crystal filling port, a spacer for keeping the two substrates a predetermined distance apart from each other, a liquid crystal layer formed by filling a liquid crystal material through said liquid crystal filling port into the clearance between the two substrates, and an end-sealing material for sealing the liquid crystal filling port, wherein total extraction amounts of an alkyl acid represented by formula (1), phenyl carboxylic acid or a phenyl carboxylic acid derivative represented by formula (2), phenylenedicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) is not more than 100 ppm when the sealing member, the end-sealing material and the spacer are subjected to extraction in the liquid crystal material:

$R_1-(COOH)_n$ (1)

(2)

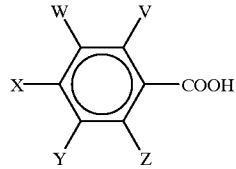

(3)

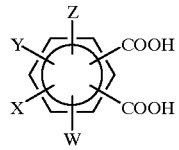

$R_1-NH_2$ (4)

(5)

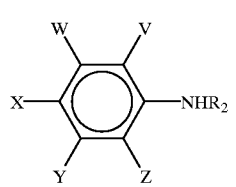

(6)

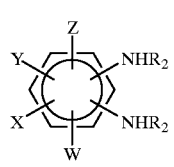

-continued

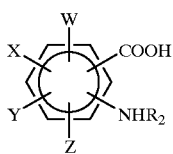

(7)

$R_1-NR_2R_3$ (8)

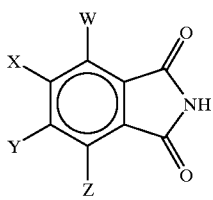

(9)

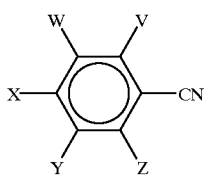

(10)

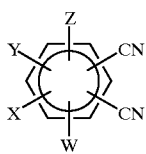

(11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

3. A liquid crystal display device according to claim 1 or 2, wherein said spacer is formed of a black resin.

4. A liquid crystal display device according to claim 3, wherein said black resin contains a green pigment.

5. A liquid crystal display device, comprising:
- a color filter substrate including a substrate, a colored layer formed on said substrate, a patterned electrode formed on said colored layer, and an alignment film formed to cover the colored layer and said electrode;
- a counter substrate arranged to face said color filter substrate;
- a sealing member arranged in the outer peripheries of said color filter substrate and counter substrate to permit the outer peripheries of these two substrate to be bonded to each other except a liquid crystal filling port;
- a spacer for keeping the two substrates a predetermined distance apart from each other;
- a liquid crystal layer formed by filling a liquid crystal material through said liquid crystal filling port into the clearance between the two substrates; and
- an end-sealing material for sealing the liquid crystal filling port,
- wherein total amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) contained in the colored layer, the sealing member, the end-sealing material and the spacer is not larger than .3%:

$R_1-(COOH)_n$ (1)

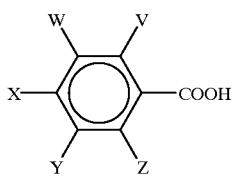

(2)

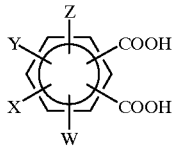

(3)

$R_1-NH_2$ (4)

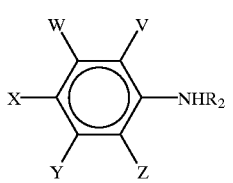

(5)

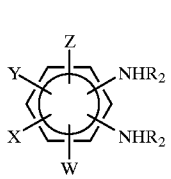

(6)

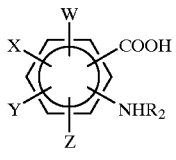

(7)

$R_1-NR_2R_3$ (8)

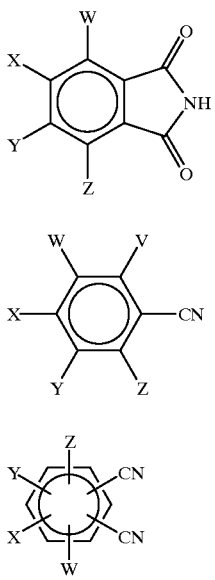

(9)

(10)

(11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

6. A liquid crystal display device, comprising:
a color filter substrate including a substrate, a colored layer formed on said substrate, a patterned electrode formed on said colored layer, and an alignment film formed to cover the colored layer and said electrode;
a counter substrate arranged to face said color filter substrate;
a sealing member arranged in the outer peripheries of said color filter substrate and counter substrate to permit the outer peripheries of these two substrate to be bonded to each other except a liquid crystal filling port;
a spacer for keeping the two substrates a predetermined distance apart from each other;
a liquid crystal layer formed by filling a liquid crystal material through said liquid crystal filling port into the clearance between the two substrates; and
an end-sealing material for sealing the liquid crystal filling port,
wherein total extraction amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) is not more than 100 ppm when the colored layer, the sealing member, the end-sealing material and the spacer are subjected to extraction in the liquid crystal material:

  (1)

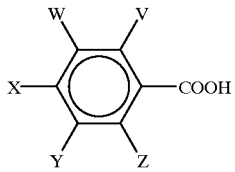  (2)

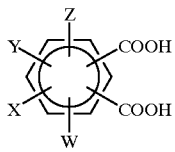  (3)

$R_1$—$NH_2$  (4)

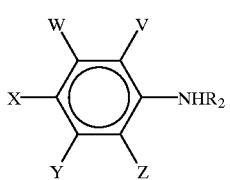  (5)

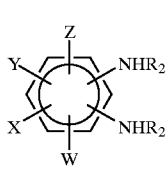  (6)

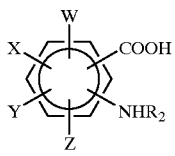  (7)

$R_1$—$NR_2R_3$  (8)

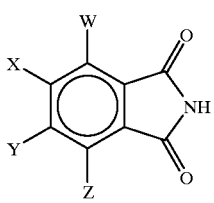  (9)

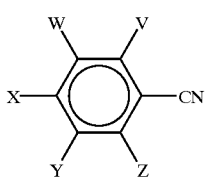  (10)

-continued

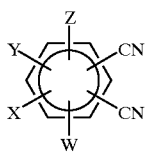
(11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

7. A liquid crystal display device, comprising:

an array substrate including a plurality of signal lines and a plurality of scanning lines arranged on one main plane of a substrate in a manner to cross each other, a switching element arranged in every cross point between the signal line and the scanning line, a colored layer arranged to cover at least partially the signal line, the scanning line and the switching element, and a plurality of pixel electrodes arranged on the colored layer and connected to the switching elements through contact holes formed in the colored layer;

a counter substrate arranged to face said array substrate;

a sealing member arranged in the outer peripheries of said array substrate and counter substrate to permit the outer peripheries of these two substrate to be bonded to each other except a liquid crystal filling port;

a spacer for keeping the two substrates a predetermined distance apart from each other;

a liquid crystal layer formed by filling a liquid crystal material through said liquid crystal filling port into the clearance between the two substrates; and an end-sealing material for sealing the liquid crystal filling port, wherein total amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) contained in the colored layer, sealing member, the end-sealing material and the spacer is not larger than 3%:

$R_1$—(COOH)$_n$ (1)

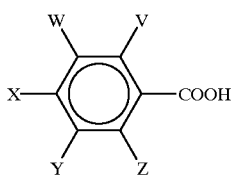
(2)

-continued

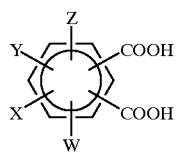
(3)

$R_1$—$NH_2$ (4)

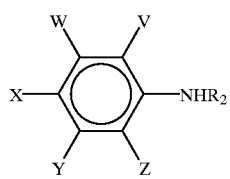
(5)

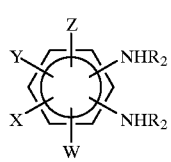
(6)

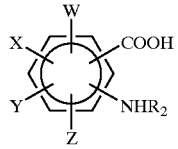
(7)

$R_1$—$NR_2R_3$ (8)

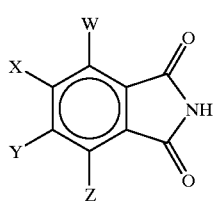
(9)

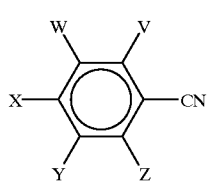
(10)

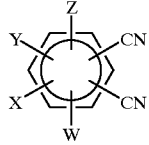
(11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

8. A liquid crystal display device, comprising:

an array substrate including a plurality of signal lines and a plurality of scanning lines arranged on one principle plane of a substrate in a manner to cross each other, a switching element arranged in every cross point between the signal line and the scanning line, a colored layer arranged to cover at least partially the signal line, the scanning line and the switching element, and a plurality of pixel electrodes arranged on the colored layer and connected to the switching elements through contact holes formed in the colored layer;

a counter substrate arranged to face said array substrate;

a sealing member arranged in the outer peripheries of said array substrate and counter substrate to permit the outer peripheries of these two substrate to be bonded to each other except a liquid crystal filling port;

a spacer for keeping the two substrates a predetermined distance apart from each other;

a liquid crystal layer formed by filling a liquid crystal material through said liquid crystal filling port into the clearance between the two substrates; and an end-sealing material for sealing the liquid crystal filling port, wherein total extraction amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) is not more than 100 ppm when the colored layer, sealing member, the end-sealing material and the spacer are subjected to extraction in the liquid crystal material:

  (1)

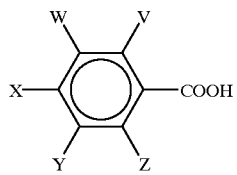  (2)

(3)

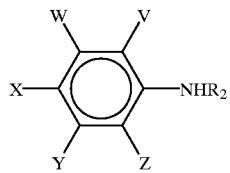

  (4)

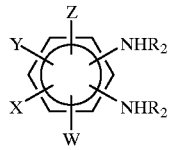  (5)

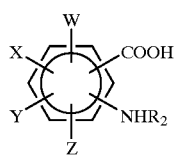  (6)

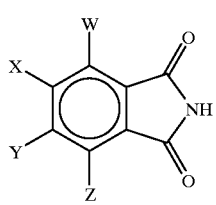  (7)

  (8)

(9)

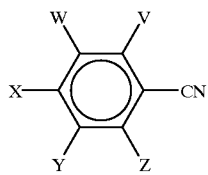

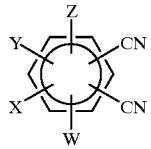  (10)

(11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

9. A liquid crystal display device according to any one of claims 5 to 8, wherein said colored layer consists of resin layers of red, blue and green.

10. A liquid crystal display device according to claim 9, wherein said spacer consists of a black resin layer.

11. A liquid crystal display device according to claim 9, wherein said black resin contains a green pigment.

12. A liquid crystal display device, comprising an array substrate and a counter substrate arranged to face each other, a liquid crystal layer arranged between said array substrate and said counter substrate, and a colored layer arranged on one of the array substrate and the counter substrate, wherein total amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) contained in the colored layer is not larger than 3%:

$R_1\text{--}(COOH)_n$ (1)

(2)

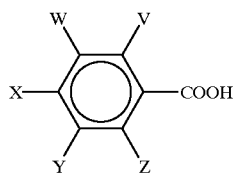

(3)

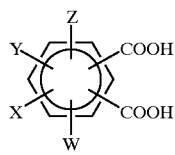

$R_1\text{--}NH_2$ (4)

(5)

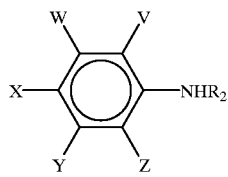

(6)

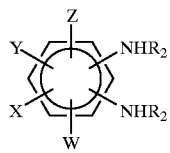

(7)

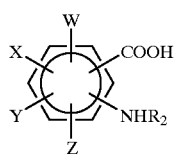

$R_1\text{--}NR_2R_3$ (8)

(9)

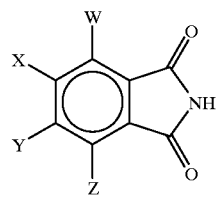

(10)

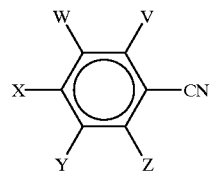

(11)

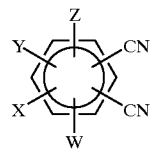

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

13. A liquid crystal display device, comprising an array substrate and a counter substrate arranged to face each other, a liquid crystal layer arranged between said array substrate and said counter substrate, and a colored layer arranged on one of the array substrate and the counter substrate, wherein total extraction amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) is not more than 100 ppm when the colored layer is subjected to in the liquid crystal material:

$R_1\text{--}(COOH)_n$ (1)

(2)

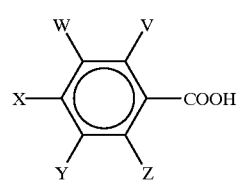

-continued

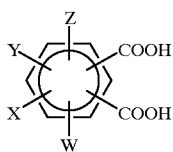 (3)

$R_1-NH_2$ (4)

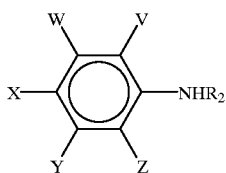 (5)

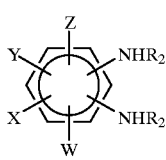 (6)

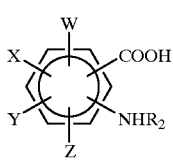 (7)

$R_1-NR_2R_3$ (8)

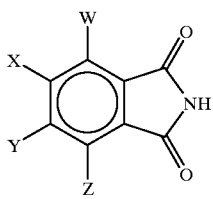 (9)

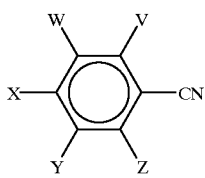 (10)

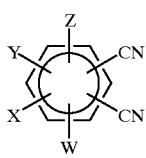 (11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

14. A liquid crystal display device, comprising:

a substrate;

a colored layer arranged on said substrate and consisting of resins colored red, blue and green;

a patterned electrode arranged on the colored layer;

a color filter substrate including said colored layer and an alignment film formed to cover said electrode;

a counter substrate arranged to face said color filter substrate;

a sealing member arranged in the outer peripheries of said color filter substrate and counter substrate to permit the outer peripheries of these two substrates to be bonded to each other except a liquid crystal filling port;

a spacer for keeping the two substrates a predetermined distance apart from each other;

a liquid crystal layer formed by filling a liquid crystal material through said liquid crystal filling port into the clearance between the two substrates; and an end-sealing material for sealing the liquid crystal filling port, wherein total amount of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) contained in the green resin used in the colored layer is not larger than 3% after formation of the colored layer:

$R_1-(COOH)_n$ (1)

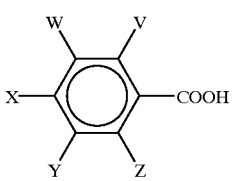 (2)

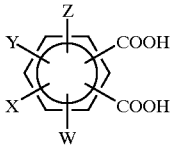 (3)

$R_1-NH_2$ (4)

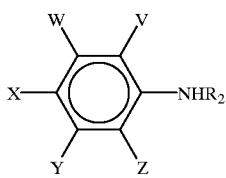 (5)

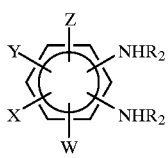 (6)

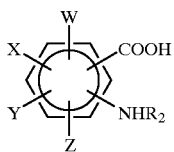 (7)

$R_1\text{—}NR_2R_3$ (8)

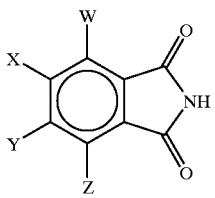 (9)

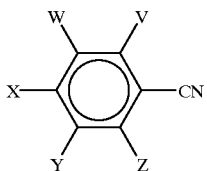 (10)

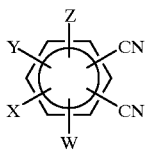 (11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

15. A liquid crystal display device, comprising:
a substrate;
a colored layer arranged on said substrate and consisting of resins colored red, blue and green;
a patterned electrode arranged on the colored layer;
a color filter substrate including said colored layer and an alignment film formed to cover said electrode;
a counter substrate arranged to face said color filter substrate;
a sealing member arranged in the outer peripheries of said color filter substrate and counter substrate to permit the outer peripheries of these two substrates to be bonded to each other except a liquid crystal filling port;
a spacer, which consists essentially of a black resin, for keeping the two substrates a predetermined distance apart from each other;
a liquid crystal layer formed by filling a liquid crystal material through said liquid crystal filling port into the clearance between the two substrates; and
an end-sealing material for sealing the liquid crystal filling port,
wherein total amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) contained in said black resin and the green resin used in the colored layer is not larger than 3% after formation of the colored layer:

$R_1\text{—}(COOH)_n$ (1)

(2)

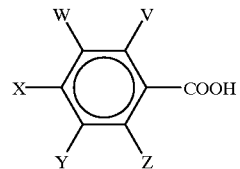 (3)

$R_1\text{—}n_2$ (4)

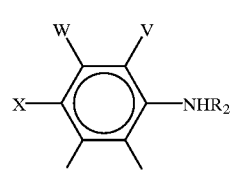 (5)

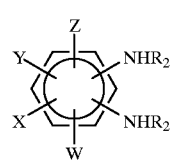 (6)

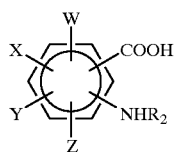
(7)

$R_1$—$NR_2R_3$ (8)

(9)

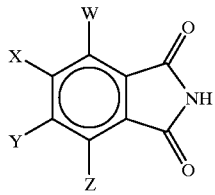
(10)

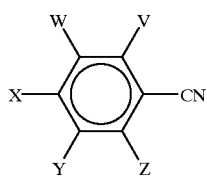
(11)

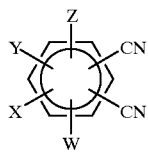

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

16. A liquid crystal display device, comprising:
an array substrate including a plurality of signal lines and a plurality of scanning lines arranged on one main plane of a substrate in a manner to cross each other, a switching element arranged in every cross point between the signal line and the scanning line, a colored layer consisting of red, blue and green resins and arranged to cover at least partially the signal line, the scanning line and the switching element, and a plurality of pixel electrodes arranged on the colored layer and connected to the switching elements through contact holes formed in the colored layer;
a counter substrate arranged to face said array substrate;
a sealing member arranged in the outer peripheries of said array substrate and counter substrate to permit the outer peripheries of these two substrates to be bonded to each other except a liquid crystal filling port;
a spacer, which consists essentially of a black resin, for keeping the two substrates a predetermined distance apart from each other;
a liquid crystal layer formed by filling a liquid crystal material through said liquid crystal filling port into the clearance between the two substrates; and
an end-sealing material for sealing the liquid crystal filling port,
wherein total amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) contained in said black resin and the green resin used in the colored layer is not larger than 3% after formation of the colored layer:

$R_1$—$(COOH)_n$ (1)

(2)

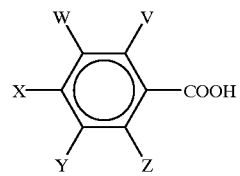

(3)

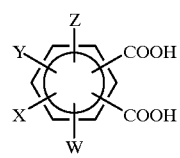

$R_1$—$NH_2$ (4)

(5)

(6)

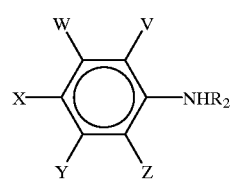

(7)

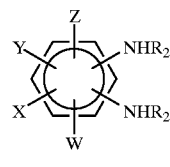

$R_1$—$NR_2R_3$ (8)

(9)
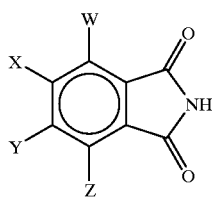

(10)
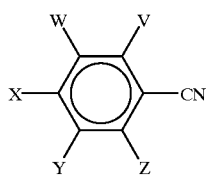

(11)
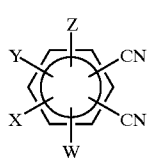

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

17. A liquid crystal display device, comprising:

an array substrate including a plurality of signal lines and a plurality of scanning lines arranged on one main plane of a substrate in a manner to cross each other, a switching element arranged in every cross point between the signal line and the scanning line, a colored layer consisting essentially of red, blue and green resins and arranged to cover at least partially the signal line, the scanning line and the switching element, and a plurality of pixel electrodes arranged on the colored layer and connected to the switching elements through contact holes formed in the colored layer;

a counter substrate arranged to face said array substrate;

a sealing member arranged in the outer peripheries of said array substrate and counter substrate to permit the outer peripheries of these two substrates to be bonded to each other except a liquid crystal filling port;

a spacer, which consists essentially of a black resin, for keeping the two substrates a predetermined distance apart from each other;

a liquid crystal layer formed by filling a liquid crystal material through said liquid crystal filling port into the clearance between the two substrates; and an end-sealing material for sealing the liquid crystal filling port, wherein total extraction amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) is not more than 100 ppm when the black resin and the green resin used in the colored layer are subjected to extraction in the liquid crystal material:

 (1)

(2)
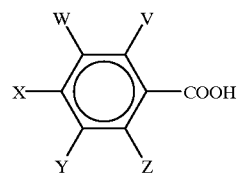

(3)
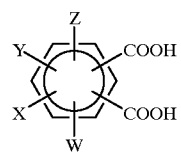

 (4)

(5)
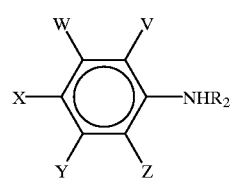

(6)
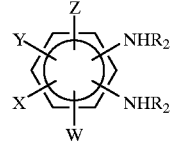

(7)
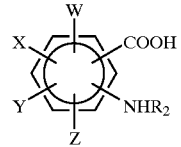

 (8)

(9)
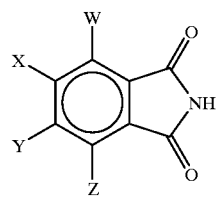

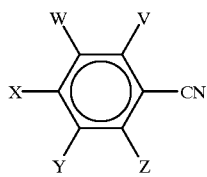 (10)

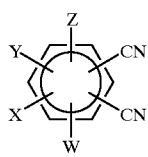 (11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

18. A colored layer material for a liquid crystal display device, said colored layer material consisting essentially of resin containing a green pigment, wherein total amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline organ aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) is not larger than 3% when said colored layer material is cured:

 (1)

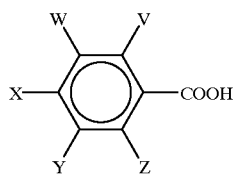 (2)

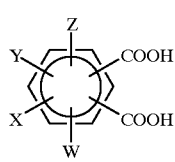 (3)

 (4)

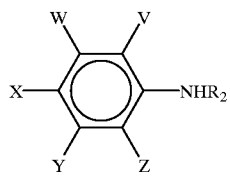 (5)

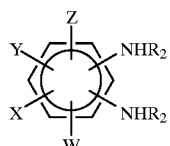 (6)

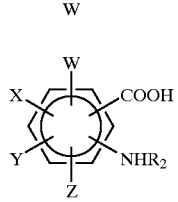 (7)

$R_1$—$NR_2R_3$ (8)

 (9)

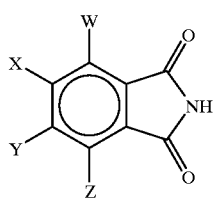 (10)

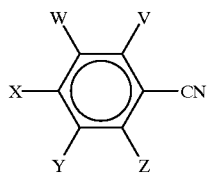 (11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

19. A colored layer material for a liquid crystal display device, said colored layer material consisting essentially of resin containing a green pigment, wherein total extraction amounts of an alkyl acid represented by formula (1), phenyl carboxylic acid or a phenyl carboxylic acid derivative represented by formula (2), phenylene dicarboxylic acid or a phenylene dicarboxylic acid derivative represented by formula (3), an alkyl amine represented by formula (4), aniline or an aniline derivative represented by formula (5), phenylene diamine or a phenylene diamine derivative represented by formula (6), phenyleneamine carboxylic acid or a phenyleneamine carboxylic acid derivative represented by formula (7), an alkyl imide represented by formula (8), a phthalimide derivative represented by formula (9), a cyano benzene derivative represented by formula (10), and a dicyano benzene derivative represented by formula (11) is not more than 100 ppm when the colored layer material is cured and, then, subjected to extraction in the liquid crystal material:

$R_1\text{-(COOH)}_n$ (1)

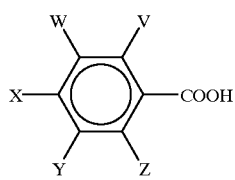 (2)

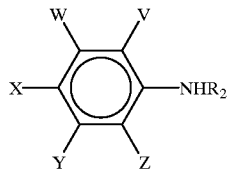 (3)

$R_1\text{-NH}_2$ (4)

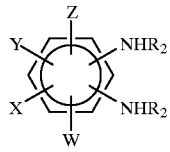 (5)

(6)

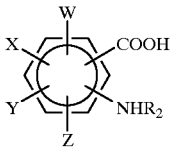 (7)

$R_1\text{-NR}_2R_3$ (8)

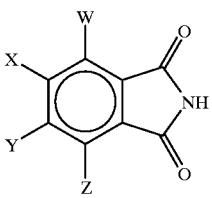 (9)

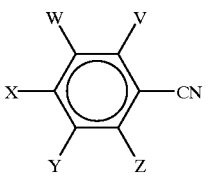 (10)

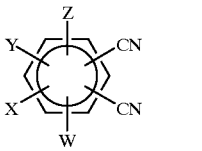 (11)

where $R_1$ is an alkyl group having 1 to 20 carbon atoms, $R_2$ is —H or an alkyl group having 1 to 20 carbon atoms, $R_3$ is an alkyl group having 1 to 20 carbon atoms, each of V, W, X, Y and Z is one selected from the group consisting of an alkyl group having 1 to 10 carbon atoms, an alkoxy group having 1 to 10 carbon atoms, —F, —Cl, —Br, —$C_6H_5$ and —H, and n is 1 or 2.

* * * * *